United States Patent
Earles et al.

(10) Patent No.: US 12,380,248 B2
(45) Date of Patent: Aug. 5, 2025

(54) DASHBOARD CAMERA AND ASSOCIATED CLOUD STORAGE SERVICE HAVING INTEGRATED FILE VALIDATION

(71) Applicants: Russell Earles, Abbeville, LA (US); Alex Songe, Lafayette, LA (US)

(72) Inventors: Russell Earles, Abbeville, LA (US); Alex Songe, Lafayette, LA (US)

( * ) Notice: Subject to any disclaimer, the term of this patent is extended or adjusted under 35 U.S.C. 154(b) by 175 days.

(21) Appl. No.: 18/216,403

(22) Filed: Jun. 29, 2023

(65) Prior Publication Data
US 2024/0005042 A1 Jan. 4, 2024

Related U.S. Application Data

(60) Provisional application No. 63/356,823, filed on Jun. 29, 2022.

(51) Int. Cl.
| | |
|---|---|
| *G06F 21/64* | (2013.01) |
| *G06F 21/60* | (2013.01) |
| *H04N 5/76* | (2006.01) |
| *G06V 20/40* | (2022.01) |
| *G06V 20/62* | (2022.01) |

(52) U.S. Cl.
CPC ............ *G06F 21/64* (2013.01); *G06F 21/602* (2013.01); *H04N 5/76* (2013.01); *G06V 20/40* (2022.01); *G06V 20/625* (2022.01); *G06V 2201/10* (2022.01)

(58) Field of Classification Search
CPC ....... G06F 21/64; G06F 21/602; G06V 20/40; G06V 20/625; G06V 2201/10; H04N 5/76
See application file for complete search history.

(56) References Cited

U.S. PATENT DOCUMENTS

| | | | |
|---|---|---|---|
| 9,466,161 B2 | 10/2016 | Ricci | |
| 10,536,278 B1* | 1/2020 | Donaldson | ............ H04L 9/3247 |
| 10,848,670 B2 | 11/2020 | Gatti et al. | |
| 10,979,636 B2 | 4/2021 | Siminoff et al. | |
| 2007/0074035 A1* | 3/2007 | Scanlon | ............... H04L 9/3247 |
| | | | 713/176 |
| 2007/0150138 A1* | 6/2007 | Plante | ................... H04N 21/44 |
| | | | 701/33.4 |

(Continued)

FOREIGN PATENT DOCUMENTS

JP            5459044 B2     4/2014

*Primary Examiner* — Vance M Little
(74) *Attorney, Agent, or Firm* — McCutcheon Joseph, PLLC

(57) ABSTRACT

A system and method for recording, backing up, and authenticating footage from a dash cam or other video device comprises continuously synchronizing checksums from segments of video as they are recorded into rolling storage with an authentication server located remotely. Only metadata is uploaded until the video device experiences an interrupt event, at which point the last few rolling segments, as well as subsequent rolling segments until the termination of the interrupt event, are written to persistent storage and uploaded to the authentication server at the earliest opportunity. The metadata and video are encrypted with an asymmetric public/private key system enabling third parties to confirm, with the public key, that the metadata on the recording device and the authentication server match, and with the private key, download the video footage from the interrupt event.

6 Claims, 1 Drawing Sheet

(56) References Cited

U.S. PATENT DOCUMENTS

| | | | | |
|---|---|---|---|---|
| 2011/0279678 A1* | 11/2011 | Tink | ........................ | G06F 16/78 |
| | | | | 348/E7.086 |
| 2012/0120241 A1* | 5/2012 | Lewis | ..................... | G06T 7/292 |
| | | | | 348/154 |
| 2012/0328148 A1* | 12/2012 | Doherty | .................. | G06F 21/64 |
| | | | | 382/100 |
| 2014/0049653 A1* | 2/2014 | Leonard | ............. | H04N 1/32331 |
| | | | | 348/207.1 |
| 2019/0385269 A1* | 12/2019 | Zachary | ................... | H04N 7/18 |
| 2021/0021407 A1* | 1/2021 | Weerasinghe | ........ | H04L 9/3218 |

* cited by examiner

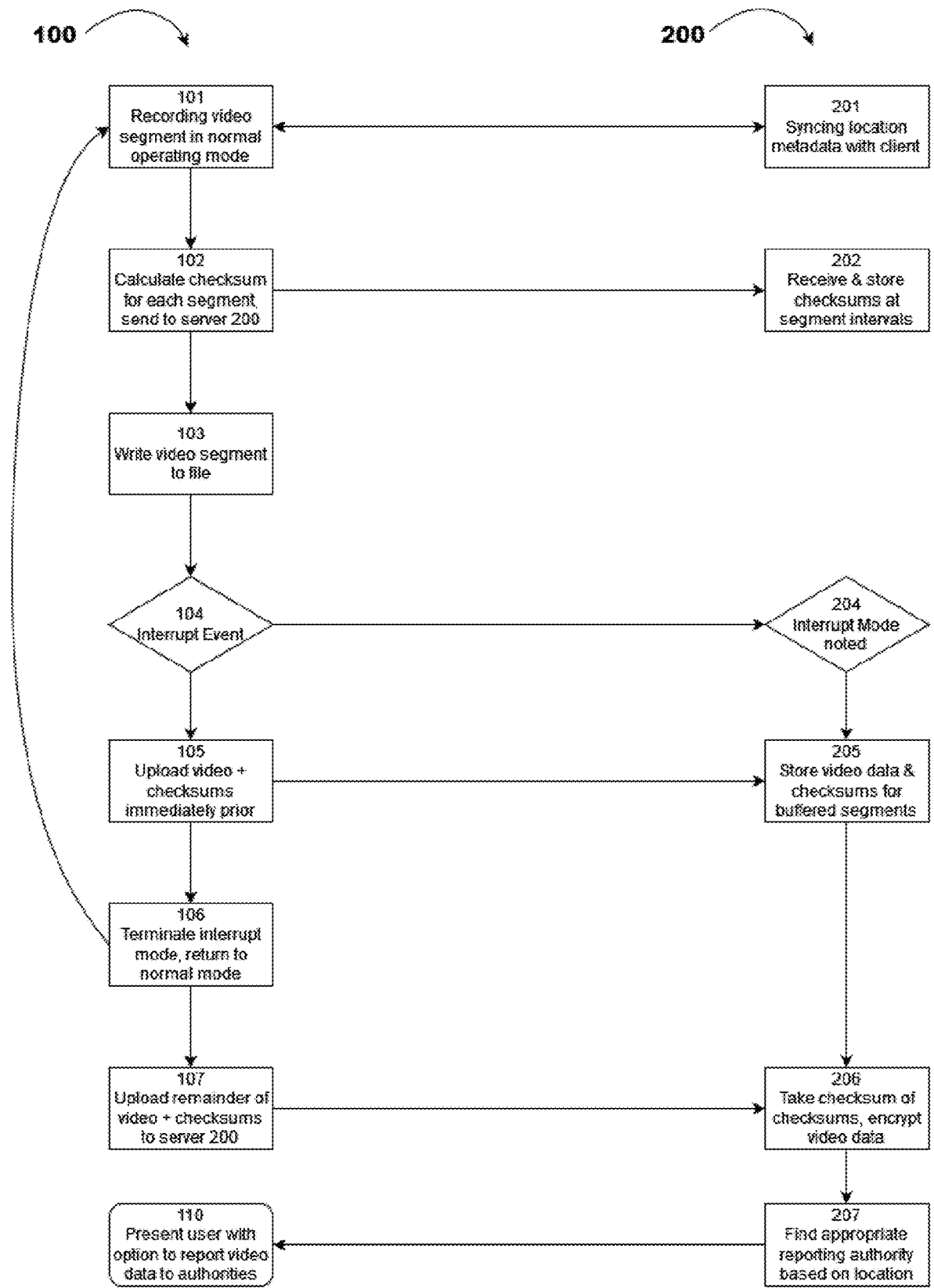

DASHBOARD CAMERA AND ASSOCIATED CLOUD STORAGE SERVICE HAVING INTEGRATED FILE VALIDATION

REFERENCE TO RELATED APPLICATIONS

The present application is a non-provisional utility patent application claiming priority to provisional patent application No. 63/356,823, filed 29 Jun. 2022 and having the same title and inventors. The contents of the above-referenced application are incorporated by reference.

FIELD

Embodiments usable within the scope of the present disclosure relate, generally, to an improved dashboard camera for use in a vehicle which automatically digitally encrypts captured video files. The encrypted file is then uploaded to a witnessing service which uses a private key to encrypt the file along with metadata including a time stamp, a location, and a checksum file, as well as a list of public keys. This creates and preserves a chain of custody in the video which can be verified by anyone (including law enforcement) and ensures that no video or metadata in the file has been altered.

BACKGROUND

Dashboard cameras are commonly used by both private and commercial drivers to establish video evidence in the event of an accident, with applications ranging from simple civil liability to criminal road rage incidents. However, these cameras often simply function by writing the last 60 seconds or so of footage to a file which is then stored on either an internal disk (e.g., flash memory) or to a cloud-based service.

The proliferation of video capture in day-to-day life has been accompanied by an increased risk of video manipulation. While in the past such alterations to dash cam videos might have been easy to spot, recent advancements in machine learning and consumer-grade video editing have made it more feasible for bad actors to selectively cut or even alter footage, and these technologies will only get more powerful and accessible.

A need therefore exists for a system which can ensure that any video footage which is intended to be presented as evidence in a legal dispute has a settled chain of custody, so the driver, law enforcement, and judicial systems can be confident that the video file represents raw capture from a dashboard camera and has not been altered in any way, while still preserving the privacy of the actual data from being viewed by parties other than authorized law enforcement investigators.

Embodiments of the invention described herein meet this and other needs.

SUMMARY

The invention comprises a software application (app) which may be run on a camera, phone, or any multimedia recording device capable of video capture and storage (including software running via SD card interface) which records and uploads a digital "fingerprint" of media (e.g., a cryptographic checksum) on a rolling basis as it is being written. In the event of an accident, the footage immediately preceding and following the event is moved from rolling storage to persistent storage, "signed" via asymmetric cryptography and uploaded to an attestation server with relevant metadata as well as the video data itself. This allows any third party with the public key to compare their own copy of the file and compare it to the checksum of the present on the attestation server. Because the data is attested on a rolling basis, neither the user nor the server can alter or edit the video footage without causing the checksums to mismatch.

BRIEF DESCRIPTION OF THE DRAWINGS

In the detailed description of the embodiments, presented below, reference is made to the accompanying drawings:

FIG. 1 depicts a flowchart having a client-side for the app as it controls the user's camera and a server-side for the attestation server.

One or more embodiments are described below with reference to the listed Figure.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings, and that the components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Turning first to FIG. 1, a flowchart is shown for the client side 100 of an embodiment of the software to be run on any suitable video capture device, including dashboard-mounted phone, dashboard camera, or combinations and equivalents thereof (e.g., an embodiment may run the software on a phone for processing the video, but record the video from an aftermarket dashcam connected to the phone rather than the phone's camera, using the storage of one or both devices). In an embodiment, the video capture device comprises both rolling and persistent memory; these may be separate physical storage mediums entirely (e.g., an SD card and internal flash drive), or they may be software-based partitions or directories of a single physical storage medium. In one embodiment, the persistent storage is "write-only" memory which cannot be modified and/or cannot be deleted without formatting or resetting the device.

In standard operating flow, the software receives segments of video 101, which it then processes in segments 102 (which may be of any suitable length depending on the processing power and bandwidth of the hardware). As the segments are processed and stored in rolling memory, a "checksum" is calculated for each segment, where the data includes both the video footage itself as well as metadata including location, time, etc., as well as a "signature" (which may be enabled via private-key cryptography) from the web service 200. In an embodiment, the checksum may be a cryptographic checksum.

Since it is not practical or desirable for a dashboard camera to stream footage constantly to a server, in normal operating mode, the software instead syncs only the metadata (i.e., the checksums of each video segment) with the web service 200. The checksums of each video segment represent a fingerprint of the data, which can be compared between server and client to ensure the data has not been altered. Only after the checksum is created are the files then written to the rolling memory within the client device 103.

When an interrupting event 104 occurs, the client system 100 enters an interrupt mode where the last few segments of video data in the rolling storage (as well as subsequent segments of video data) are moved to persistent storage and uploaded to the web service 200 alongside the checksums 105. An interrupting event 104 may be automatically triggered (e.g., by accelerometers, which are commonly built into smartphones, detecting a sudden drop in velocity) or the event may be initiated by a user (e.g., in the event of a confrontation in a parking lot where no sudden change in velocity may be apparent).

Similarly, the duration of the upload initiated after the interrupting event 104 may be either a predetermined length of time (e.g., five minutes subsequent to the interrupting event), or may be terminated based on the absence of a triggering condition, or by the user's manual command. Regardless of the duration, during interrupt mode, the client will continue to persistently record both video and metadata until the system 100 returns to standard operating flow 106. Once standard operating mode is resumed, the files, metadata, and checksums recorded during the interrupt mode are uploaded to the server 107 at the earliest opportunity (if sufficient bandwidth is available, this upload may happen in real-time, or if the interrupting event took place without sufficient wireless data coverage, when the device is back in range of such).

The web service 200 syncs with the client device (i.e., the video capture device) to record the location of the device 201 and receives a series of video segment checksums from the client-side device during standard operating flow 202. When the client-side notes an interrupting event 104 and begins sending video, the web service 200 then enters a corresponding interrupt mode 204 where the checksums and video files are received and stored on the server for both the buffered segments immediately prior to the event 205 as well as the segments received shortly after the event 206. Once the interrupt mode is terminated, the web service 200 then encrypts the segments, calculating a "full signature" (e.g., a checksum of checksums) for the segments comprising the buffer duration before and after the interrupting event 204, and then returns to normal operating flow.

If, in a future legal dispute, the user's client-side files are entered into evidence, this "full signature" can also be re-calculated from the files on the client side persistent memory, and compared with the full signature from the server side. If any alterations are made, the checksums will no longer match, and the file will be flagged as invalid.

In an embodiment, the client-side 100 and server-side 200 may utilize asymmetric cryptography wherein the client-side 100 encrypts the metadata utilizing a public encryption key corresponding to a private decryption key available only to the server-side software 200. The server-side software may then return a valid/invalid comparison to any approved third-party (e.g., an investigating agency) with the public key while still not enabling decryption or viewing of the actual video footage.

In another embodiment, the client-side software 100 may assist the user in filing a report on the incident with law enforcement and/or insurance 110. This could be done by, e.g., using the location data recorded as part of the video segments to locate a jurisdiction with authority over the incident, using insurance information configured by the user during setup, pre-generating a report form appropriate to that jurisdiction, and/or including a link to the files located on the server-side, where the client can authorize release of the video to law enforcement. Since the checksums are calculated and synced prior to being written to the local persistent storage, law enforcement can then view the footage directly from the server without first needing to take custody of the user's client-side device (which may be more convenient, e.g., if the user was traveling out of town).

In still another embodiment, the server-side software 200 may also comprise a digital character recognition engine for alphanumeric license plate strings. When the system is actively recording, the footage can be analyzed to yield visible license plates as metadata, which can then be directly sent to law enforcement alongside the video itself.

Although several preferred embodiments of the invention have been illustrated in the accompanying drawings and described in the foregoing specification, it will be understood by those of skill in the art that additional embodiments, modifications and alterations may be constructed from the invention principles disclosed herein, while still falling within the scope of the disclosed invention.

The invention claimed is:

1. A method for independently authenticating video footage following and immediately preceding an interrupt event, the method comprising:
   recording sequential segments of video footage on a video capture device, the video capture device comprising a wireless internet connection, rolling storage, and permanent storage, and the video footage comprising location metadata, date/time metadata, and checksum metadata;
   for each sequential segment of video footage, synchronizing the location metadata, the date/time metadata, and the checksum metadata with a server;
   simultaneously writing the sequential segments of video footage to the rolling storage;
   engaging an interrupt mode when an interrupt event is detected, and transmitting the location metadata and date/time metadata associated with the interrupt event to the server;
   when the interrupt mode is engaged, copying the sequential segments of video footage written to rolling storage to the permanent storage;
   while the interrupt mode is engaged, writing subsequent sequential segments of video footage to the permanent storage;
   when the interrupt mode is terminated, uploading the sequential segments of video footage recorded while in interrupt mode to the server, while resuming the rolling storage of sequential segments of video footage;

encrypting, with the server, the sequential segments of video footage with a private key; and encrypting, with the server, the metadata, corresponding to the sequential segments of video footage with a public key corresponding to the private key.

2. The method of claim 1, further comprising the step of:

decrypting, with the server, the metadata corresponding to the sequential segments of video footage when requested with the public key.

3. The method of claim 1, wherein the persistent storage is write-only.

4. The method of claim 1, wherein the video footage further comprises license plate metadata derived from optical character recognition of video frames.

5. The method of claim 1, further comprising the steps of:

when the interrupt mode is terminated, selecting a reporting agency based on the location metadata and date/time metadata; and generating a report of the interrupt event, including the public key, for the user to submit to the reporting agency.

6. The method of claim 5, wherein the report includes the private key, enabling decryption of the video files by the reporting agency.

* * * * *